United States Patent
Sakagami et al.

(10) Patent No.: US 9,522,516 B2
(45) Date of Patent: Dec. 20, 2016

(54) OVERSHEET FOR CARD

(75) Inventors: Toshinori Sakagami, Yokkaichi (JP); Akira Shimizu, Yokkaichi (JP)

(73) Assignee: JAPAN COLORING CO., LTD., Yokkaichi-shi (JP)

( * ) Notice: Subject to any disclaimer, the term of this patent is extended or adjusted under 35 U.S.C. 154(b) by 1412 days.

(21) Appl. No.: 12/672,682

(22) PCT Filed: Sep. 9, 2008

(86) PCT No.: PCT/JP2008/066250
§ 371 (c)(1),
(2), (4) Date: Feb. 8, 2010

(87) PCT Pub. No.: WO2009/037993
PCT Pub. Date: Mar. 26, 2009

(65) Prior Publication Data
US 2011/0123766 A1 May 26, 2011

(30) Foreign Application Priority Data
Sep. 20, 2007 (JP) ................. 2007-243498

(51) Int. Cl.
B32B 27/08 (2006.01)
B32B 27/20 (2006.01)
B32B 27/22 (2006.01)
B32B 27/36 (2006.01)
B42D 25/41 (2014.01)
B42D 25/00 (2014.01)
B32B 27/28 (2006.01)

(52) U.S. Cl.
CPC .............. *B32B 27/08* (2013.01); *B32B 27/20* (2013.01); *B32B 27/22* (2013.01); *B32B 27/285* (2013.01); *B32B 27/36* (2013.01); *B32B 27/365* (2013.01); *B42D 25/00* (2014.10); *B42D 25/41* (2014.10); *B32B 2250/03* (2013.01); *B32B 2264/108* (2013.01); *B32B 2307/306* (2013.01); *B32B 2307/412* (2013.01); *B32B 2307/538* (2013.01); *B32B 2307/702* (2013.01); *B32B 2307/71* (2013.01); *B32B 2307/7145* (2013.01); *B32B 2307/75* (2013.01); *B32B 2425/00* (2013.01); *B42D 2033/04* (2013.01); *Y10T 428/24355* (2015.01)

(58) Field of Classification Search
USPC .................................. 428/141, 220
See application file for complete search history.

(56) References Cited

U.S. PATENT DOCUMENTS

| 4,307,047 | A | 12/1981 | Edinger et al. |
| 4,391,764 | A | 7/1983 | Edinger et al. |
| 4,401,992 | A | 8/1983 | Vorst et al. |
| 2001/0018111 | A1 | 8/2001 | Sugie et al. |
| 2006/0182922 | A1* | 8/2006 | Ishida et al. ............ 428/44 |
| 2006/0251869 | A1* | 11/2006 | Herslow ............ 428/204 |
| 2007/0032601 | A1* | 2/2007 | Tasaki et al. ............ 525/240 |
| 2008/0076065 | A1* | 3/2008 | Bennett et al. ............ 430/285.1 |
| 2008/0107879 | A1* | 5/2008 | Kliesch et al. ............ 428/212 |
| 2008/0193685 | A1* | 8/2008 | Aoshima ............ 428/32.12 |
| 2009/0098325 | A1* | 4/2009 | Uchida et al. ............ 428/36.91 |

FOREIGN PATENT DOCUMENTS

| EP | 1057656 | | 12/2000 |
| JP | 62-59663 | B2 | 4/1981 |
| JP | 61-41320 | B2 | 11/1981 |
| JP | 61-11771 | B2 | 7/1982 |
| JP | 61-192737 | | 8/1986 |
| JP | 2-47314 | B2 | 1/1987 |
| JP | 7-276575 | | 10/1995 |
| JP | 10-100356 | | 4/1998 |
| JP | 10-138427 | | 5/1998 |
| JP | 11-100452 | | 4/1999 |
| JP | 2000-351186 | | 12/2000 |
| JP | 2001-162749 | | 6/2001 |
| JP | 2001-171274 | | 6/2001 |
| JP | 2002-144511 | | 5/2002 |
| JP | 2002-24965 | | 9/2002 |
| JP | 2002-273832 | | 9/2002 |
| JP | 2003-191419 | | 7/2003 |
| JP | 2004-243685 | | 9/2004 |
| JP | 2006-35740 | | 2/2006 |
| JP | WO2006101063 | * | 3/2006 |
| JP | 2006-213009 | | 8/2006 |
| JP | 2007-210166 | | 8/2007 |
| JP | 3889431 | B1 | 8/2007 |

OTHER PUBLICATIONS

Tsai, Y., et al., "Poly(ethylene terephthalate) Copolymers That Contain 5-tert-Butylisophthalic Acid and 1,3/1,4-Cyclohexanedimethanol: Synthesis, Characterization and Properties", Jan. 22, 2007, Journal of Applied Polymer Science, vol. 104, pp. 279-285.*

Knizhnik, Irina, USPTO Translator, Partial Translation of JP 3889431B1, Oct. 8, 2014.*

Extended European Search Report for corresponding EP Application No. 08831359.8-1217, Dec. 14, 2012.

* cited by examiner

*Primary Examiner* — Maria Veronica Ewald
*Assistant Examiner* — Brian Handville
(74) *Attorney, Agent, or Firm* — Oblon, McClelland, Maier & Neustadt, L.L.P.

(57) ABSTRACT

There is provided an over-sheet for a card, the sheet being formed of at least three layers including a skin layer and a core layer and laminated by a coextrusion technique. The skin layer, which is an outermost layer on both sides of the three-layer sheet, is formed of a substantially amorphous aromatic polyester-based resin composition containing 0.01 to 3 parts by mass of at least one lubricant selected from the group of fatty acid ester, fatty acid amide, and fatty acid metal salt. The core layer is formed of a polycarbonate resin.

11 Claims, No Drawings

OVERSHEET FOR CARD

TECHNICAL FIELD

The present invention relates to an over-sheet used for a plastic card or the like such as a magnetic stripe card and an IC card and to an over-sheet for a card where marking can be performed with no damage by laser beam irradiation; where a sharp contrast is formed between the color of basis material and the printing portion; and clean letters, symbols, and images can be obtained; and which is excellent in thermal resistance.

BACKGROUND ART

A personal name, symbol, letter, and photograph are applied on a plastic card such as a credit card, cash card, ID card, and tag card by silk printing or sublimation printing. However, there is a problem of inferior productivity because of a complex manufacturing process.

On the other hand, as a printing technique using no ink, there has been proposed a laser marking method where printing is performed on a plastic formed body by irradiating a laser beam in, for example, Patent Documents 1 to 5.

However, when a method where laser marking is taken into consideration is applied to a plastic multilayer sheet having a superficial transparent surface skin layer, various kinds of problems arise. For example, in the multilayer sheet of Patent Document 7, when adhesion between the surface skin layer and the inner layer is bad, the transparent surface skin layer is expanded or damaged by gas generating upon marking to cause a new problem if the conditions of laser marking on the inner layer serving as an energy adsorber of a laser beam do not sufficiently match.

Furthermore, when the multilayer sheet in Patent Documents 7 and 8 is used as an over-sheet for a card, there arise problems of sticking of the sheet to a carrier machine even if negative pressure is cancelled in a sheet-carrying step, sticking of the over-sheet on a die (die-sticking) in the step of thermal fusion bonding at the space between sheets by hot press, and expanding or damaging the transparent surface skin layer due to gas burned generating at the interface between the core sheet and the over-sheet when a laser beam is irradiated because outgassing is bad at the interface between the core sheet and the over-sheet. Thus, further improvement has been required.

[Patent Document 1] JP-B-61-11771
[Patent Document 2] JP-B-62-59663
[Patent Document 3] JP-B-61-41320
[Patent Document 4] JP-A-61-192737
[Patent Document 5] JP-B-2-47314
[Patent Document 6] JP-A-7-276575
[Patent Document 7] JP-A-2002-273832
[Patent Document 8] Japanese Patent No. 3889431

DISCLOSURE OF THE INVENTION

The present invention has been made to solve the aforementioned problems and aims to provide an over-sheet for a card which is excellent in laser marking ability to the over-sheet; where a sharp contrast is formed between the color of basis material and the printing portion; and clean letters, symbols, and images can be obtained; and which has carrying ability of sheets in a card lamination step, mold releasability after hot press, thermal resistance, foldability, and transparency.

According to the present invention, there is provided the following over-sheet for a card.

[1] An over-sheet for a card, the sheet being formed of at least three layers including a skin layer and a core layer and laminated by a coextrusion technique, wherein the skin layer, [A-1] which is an outermost layer on both side of the three layers, is of polyester formed of: a dicarboxylic acid unit containing, as a main component, terephthalic acid unit; and a glycol unit containing, as a main component, an ethylene glycol unit (I) and 1,4-cyclohexanedimethanol unit (II) and is formed of a substantially amorphous aromatic polyester-based resin composition containing 0.01 to 3 parts by mass of at least one lubricant selected from the group of fatty acid ester, fatty acid amide, and fatty acid metal salt with respect to 100 parts by mass of copolymerized polyester resin where the ethylene glycol unit (I) and 1,4-cyclohexanedimethanol unit (II) have a relation of (I)/(II) =90 to 30/10 to 70 mole %; and the core layer contains 0.0001 to 3 parts by mass of carbon black, which is an energy absorber, or 0.0001 to 6 parts by mass of a mixture of carbon black and at least one selected from the group consisting of metal oxide, metal sulfate, metal carbonate and metal silicate having an average particle size of less than 100 nm with respect to 100 parts by mass of a polycarbonate resin; and the total thickness of the three-layer sheet is 50 to 150 μm, and a percentage of the thickness of the core layer in the total thickness of the three-layer sheet is 25% or more and less than 75%.

[2] An over-sheet for a card according to [1], wherein the percentage of the thickness of the core layer in the total thickness of the three-layer sheet is 25% or more and less than 50%.

[3] An over-sheet for a card according to [1] or [2], wherein mat processing of an average roughness (Ra) of 0.1 to 1.0 μm is applied on a surface on one side of the over-sheet for a card, and mat processing of an average roughness (Ra) of 1.1 to 5 μm is applied on a surface on the other side of the over-sheet for a card.

[4] An over-sheet for a card according to any one of [1] to [3], wherein the carbon black as an energy absorber has an average particle size of 10 to 90 nm, and an amount of dibutyl phthalate oil absorption of 60 to 170 ml/100 g.

[5] An over-sheet for a card according to any one of [1] to [4], wherein the core layer contains 0.1 to 5 parts by mass of an antioxidant and/or an anticolorant and 0.1 to 5 parts by mass of an ultraviolet absorber and/or a light stabilizer with respect to 100 parts by mass of polycarbonate resin.

[6] An over-sheet for a card according to any one of [1] to [5], wherein the skin layer contains 0.01 to 5 parts by mass of an antimicrobial with respect to 100 parts by mass of copolymerized polyester resin.

According to the present invention, excellent effects are exhibited that there can be provided an over-sheet for a card having excellent laser marking ability to the over-sheet, that a sharp contrast is formed between the color of basis material and the printing portion, that clean letters, symbols, and images can be obtained, and that the over-sheet for a card has carrying ability of sheets in a card lamination step, mold-releasability after hot press, thermal resistance, foldability, and transparency.

BEST MODE FOR CARRYING OUT THE INVENTION

Hereinbelow, the best mode for carrying out an over-sheet for a card of the present invention will be described specifically. However, the present invention widely includes over-sheets for a card provided with the invention-specifying features and is not limited to the following embodiment.

[1] Constitution of Over-Sheet for a Card of the Present Invention

An over-sheet for a card of the present invention is formed of at least three layers including a skin layer and a core layer and laminated by a coextrusion technique. The skin layer, [A-1] which is an outermost layer on both side of the three layers, is of polyester formed of: a dicarboxylic acid unit containing, as the main component, terephthalic acid unit; and a glycol unit containing, as the main component, an ethylene glycol unit (I) and 1,4-cyclohexanedimethanol unit (II) and is formed of a substantially amorphous aromatic polyester-based resin composition containing 0.01 to 3 parts by mass of at least one lubricant selected from the group consisting of fatty acid ester, fatty acid amide, and fatty acid metal salt with respect to 100 parts by mass of copolymerized polyester resin where the ethylene glycol unit (I) and 1,4-cyclohexanedimethanol unit (II) have a relation of (I)/(II)=90 to 30/10 to 70 mole %; and the core layer contains 0.0001 to 3 parts by mass of carbon black, which is an energy absorber, or 0.0001 to 6 parts by mass of a mixture of carbon black and at least one selected from the group consisting of metal oxide, metal sulfate, metal carbonate and metal silicate having an average particle size of less than 100 nm with respect to 100 parts by mass of a polycarbonate resin; and the total thickness of the three-layer sheet is 50 to 150 μm, and a ratio of the thickness of the core layer to the total thickness of the three-layer sheet is 25% or more and less than 75%.

[1-1] Three-Layer Sheet

The three-layer sheet is constituted as a sheet having an at least three-layer structure including a skin layer and a core layer and lamination-formed by coextrusion. Incidentally, as described above, the three-layer sheet of the present embodiment has "at least three layers" and is not limited to a sheet having a three-layer structure. In other words, as long as the over-sheet has an at least three-layer structure, the sheet constituted of five layers, the sheet constituted of seven layers, and the sheet constituted of more odd-numbered layers are all included in the over-sheet of the present embodiment. The reason why the over-sheet for a card of the present embodiment is called "three-layer sheet is because of convenience of description, and the "three-layer sheet" means the "sheet having at least three layers". There is no intention of limiting to a sheet having "three layers".

However, it is necessary that the skin layer described below is disposed in the outermost position of the sheet constituted of multi-layers on both sides of the sheet so that the core layer is sandwiched by skin layers. Furthermore, the skin layer has to have a thickness in a predetermined range. Incidentally, though the aforementioned "more odd-numbered layers" are included in the "three-layer sheet" of the present embodiment, in an over-sheet for card having too many layers, each of the skin layers and the core layers is too thin, and so-called die-sticking is caused in a hot press step upon laminating cards. Therefore, the over-sheet for a card is constituted of preferably five layers, more preferably three layers.

Here, the reason why the over-sheet is constituted of odd-numbered layers as described above is because an over-sheet constituted of even-numbered layers necessarily has the same structure as an over-sheet having odd-numbered layers. For example, an over-sheet having four layers has a disposition of a skin layer (PETG)/a core layer (PC)/a core layer (PC)/a skin layer (PETG), which has the same constitution as core sheet having odd-numbered layers eventually.

For example, in an over-sheet for a card constituted of three layers, a disposition of a skin layer (PETG)/a core layer (PC)/a skin layer (PETG) is made. Thus, two skin layers are disposed on both the outermost sides, and a core layer is disposed between the two skin layers to form an over-sheet for a card. In addition, for example, in an over-sheet for a card constituted of five layers, a disposition of a skin layer (PETG)/a core layer (PC)/a skin layer (PETG)/a core layer (PC)/a skin layer (PETG) is made. Thus, two skin layers are disposed on both the outermost sides, and skin layers and core layers may be disposed alternately to form an over-sheet for a card. In the case that there is no intermediate layer sheet or intermediate layer locating in a lower part of the over-sheet by forming an over-sheet for a card having a multi-layer structure in such a manner, it is desirable because sufficient thermal adhesion to the core sheet can be secured and because fine adjustment is possible in sheet-carrying ability in a lamination step, mold-releasability after hot press, foldability, transparency, and the like.

In addition, it is necessary that the total thickness (gross thickness) of the three-layer sheet is 50 to 150 μm. When the total thickness of the three-layer sheet is less than 50 μm, there arises a problem of die-sticking where the over-sheet sticks to a die upon thermal adhesion in a card lamination step. When the total thickness of the three-layer sheet is more than 150 μm, a card formed by using the three-layer sheet having a thickness of more than 150 μm has a thickness of more than 800 μm, which is the maximum total thickness of a specification of general contact or noncontact cards. Therefore, such an over-sheet is not preferable because it lacks versatility and has difficulty in usage. That is, the total thickness is an important element having influence on the adhesiveness of a card and a problem of die-sticking. However, not only the total thickness of the entire three-layer sheet, but also the ratio of each of the skin layers and the core layer(s) constituting the three-layer sheet to the three-layer sheet is an important element having an influence on generation of warpage of a card or the like in connection with the thickness of the entire three-layer sheet. Therefore, the relation between the total thickness of the three-layer sheet and the thickness of each of the skin layers and the core layer(s) will be described later in detail.

[1-2] Skin Layer:

The skin layer is constituted as the outermost layers disposed on both the outsides of the three-layer sheet. That is, the skin layers are disposed so as to sandwich the core layer described later from both the end face sides (outside). Each of the skin layers plays a role of a surface layer (outermost layer) of the three-layer sheet.

The skin layers sandwiching a core layer and disposed on the outermost sides preferably have the same thickness. When an over-sheet for a card is constituted of skin layers having different thickness, warpage of the sheet generates in a card press step or the like, which is not preferable. In addition, in the case of an over-sheet constituted of three layers of a skin layer (PETG)/a core layer (PC)/a skin layer (PETG), each of the skin layers has a thickness of preferably 15 to 50 μm, more preferably 20 to 40 μm. When the skin layer is too thin, it causes generation of die-sticking and deterioration in thermal adhesion. On the other hand, when the skin layer is too thick, the thickness of the core layer described later is inevitably thin, which causes a problem of generating warpage in the card after card lamination, which is not preferable.

The skin layer is formed as a layer of a polyester-based resin composition, that is, a substantially amorphous aromatic polyester-based resin composition described later and prepared by the copolymerized polyester resin ([A-1]) described later and the lubricant described later.

[1-2-1] Copolyester Resin:

The copolymerized polyester resin used in the present embodiment is blended as the main component of the amorphous aromatic polyester resin composition. For the skin layer, there is used a copolymerized polyester resin containing: a dicarboxylic acid unit containing, as the main component, terephthalic acid unit; and a glycol unit containing, as the main component, an ethylene glycol unit (I) and 1,4-cyclohexanedimethanol unit (II), where the ethylene glycol unit (I) and 1,4-cyclohexanedimethanol unit (II) have a relation of (I)/(II)=90 to 30/10 to 70 mole %. The reason why the amounts of the ethylene glycol and 1,4-cyclohexanedimethanol are controlled is because, in the copolymerized polyester resin, a resin obtained with the substitution amount of the ethylene glycol component of less than 10 mol % is not sufficiently amorphous, and recrystallization proceeds in the cooling step after thermal fusion bonding to cause deterioration in thermal adhesion. In addition, a resin obtained with above 70 mol % is not sufficiently amorphous, and recrystallization proceeds in the cooling step after thermal fusion bonding to cause deterioration in thermal adhesion. Therefore, a resin obtained by adjusting the component amount of the ethylene glycol and 1,4-cyclohexanedimethanol as in the present embodiment is sufficiently amorphous and excellent in thermal adhesion. Therefore, such a resin is preferable.

Furthermore, an example of a commercially available copolymerized polyester resin is a substantially amorphous aromatic polyester resin (Trade name: "PETG" produced by Eastman Chemical Company), where about 30 mol % of ethylene glycol component in polyethylene telephthalate is substituted by 1,4-cyclohexanedimethanol.

[1-2-2] Lubricant:

The lubricant used in the present embodiment is prepared in such a manner that at least one lubricant selected from the group of fatty acid ester, fatty acid amide, and fatty acid metal salt is added to [A-1] polyester formed of: a dicarboxylic acid unit containing, as the main component, terephthalic acid unit; and a glycol unit containing, as the main component, an ethylene glycol unit (I) and 1,4-cyclohexanedimethanol unit (II) with respect to 100 parts by mass of copolymerized polyester resin where the ethylene glycol unit (I) and 1,4-cyclohexanedimethanol unit (II) have a relation of (I)/(II)=90 to 30/10 to 70 mole %. The amount of the lubricant is 0.01 to 3 parts by mass, preferably 0.05 to 1.5 parts by mass. When the amount is less than 0.01 parts by mass, it adheres to a press plate. When the amount is more than 3 parts by mass, a problem is caused regarding thermal adhesion of a card, which is not preferable.

Examples of a fatty acid ester-based lubricant include butyl stearate, cetyl palmitate, monoglyceride stearate, diglyceride stearate, triglyceride stearate, ester of montan wax acid, wax ester, dicarboxylic acid ester, and complex ester. Examples of a fatty acid amide-based lubricant include stearic acid amide, and ethylene bisstearylamide. Examples of a fatty acid metal salt-based lubricant include calcium stearate, magnesium stearate, zinc stearate, aluminum stearate, and barium stearate.

Furthermore, it is possible to manufacture a card having antimicrobial property by adding an antimicrobial agent in the skin layer. Examples of the antimicrobial agent includes a silver-based antimicrobial agent such as silica gel silver, silver zeolite, and calcium silver phosphate; a pyrithione-based antimicrobial agent such as bis(pyridine-2-thiol-1-oxide) zinc salt; a nytrile-based antimicrobial agent such as 2,4,5,6-tetrachloroisophthalonitrile; an organic iodine-based antimicrobial agent; a benzimidazole-based antimicrobial agent, and a triazine-based antimicrobial agent.

[1-3] Core Layer:

The core layer is disposed in the center of the three-layer sheet and constituted as a so-called core layer. That is, the core layer is formed as a central core layer of the three-layer sheet in such a manner that the core layer is sandwiched by the two skin layers disposed on the outermost sides. The percentage of the thickness of the core layer in the total thickness of the whole sheets is preferably 25% or more and less than 75%, more preferably 25% or more and less than 50%. When the percentage of the thickness of the core layer is 75% or more, the gross thickness of the over-sheet is so thin as 50 to 150 μm, and therefore skin layers become relatively thin, which is not preferable because of generating a die-sticking problem where the over-sheet sticks to the die in a hot press step in a card lamination process even if a lubricant is mixed in the skin layer. When the percentage of the thickness of the core layer is less than 25%, a die-sticking problem is not caused in a card press step because of thick skin layer. However, warpage is caused in the sheet because of poor thermal resistance, which is not preferable.

As a material for constituting the core layer, there is used a transparent polycarbonate resin. There is no particular limitation on a polycarbonate resin used, and a polycarbonate resin having a melt volume rate of 4 to 20 can suitably be used. When the melt volume rate is less than 4, it is not preferable for practical use because of poor formability through it improves the sheet toughness. When the melt volume rate is more than 20, the sheet has poor toughness, which is not preferable.

[1-4] Energy Absorber:

As an energy absorber, there can be used at least one kind selected from the group consisting of carbon black, metal oxide, metal sulfate, carbonate, and metal silicate.

As the carbon black, a carbon black having an average particle size of 10 to 90 nm and an amount of dibutyl phthalate (DBT) oil absorption of 60 to 170 ml/100 g is preferable. When the average particle size of the carbon black is less than 10 nm, laser chromic property deteriorates, and it has difficulty in handling because it is too fine. When the average particle size of the carbon black is more than 90 nm, transparency of the sheet may deteriorate, or large irregularity may generate on the surface of the sheet, which is not preferable. In addition, when the amount of DBT oil absorption is less than 60 ml/100 g, the carbon black has poor dispersibility. When the amount of DBT oil absorption is more than 170 ml/100 g, opacifying power deteriorates, which is not preferable.

In addition, with regard to the metal oxide, examples of the metal forming an oxide include zinc, magnesium, aluminum, iron, titanium, silicon, antimony, tin, copper, manganese, cobalt, vanadium, niobium, molybdenum, ruthenium, tungsten, palladium, silver, and platinum.

In addition, examples of the metal sulfate include zinc sulfate and cadmium sulfate. Furthermore, examples of the carbonate include calcium carbonate, and examples of the metal silicate include aluminum silicate, aluminum silicate containing iron (mica), aqueous aluminum silicate (kaolin), magnesium silicate (talc), calcium silicate, and magnesium silicate.

As the energy absorber, carbon black is preferably used, and in addition a mixture of carbon black and at least one selected from the group consisting of metal oxides, metal sulfates, metal carbonates, and metal silicates having an average particle size of less than 100 nm is also preferably used.

The amount of carbon black to be added (blending amount) as an energy absorber is 0.0001 to 3 parts by mass, more preferably 0.0001 to 1 parts by mass. When carbon black and one selected from the group consisting of metal oxides, metal sulfates, metal carbonates, and metal silicates having an average particle size of 100 nm are used together, the blending amount of the mixture is 0.0001 to 6 parts by mass, more preferably 0.0001 to 3 parts by mass. The amount of the energy absorber to be added (blending amount) is adjusted because of the following reason. That is, an over-sheet for a card is preferably transparent. There are many cases of applying printing on an intermediate layer, which is the under layer of the over-sheet, or a core sheet. In such a case, if the over-sheet has poor transparency, printed images or letters are unclear, which is a problem upon practical use. Therefore, carbon black having a small average particle size is preferably used. In addition, also in the case that a mixture of carbon black and at least one selected from the group consisting of metal oxides, metal sulfates, metal carbonates, and metal silicates is used as a laser energy absorber, the metal oxides, metal sulfates, metal carbonates, and metal silicates have an average particle size of less than 100 nm, preferably less than 50 nm.

Therefore, when the average particle size of the laser energy absorber is more than 100 nm, transparency of the over-sheet decreases, which is not preferable. In addition, when the blending amount of the laser energy absorber is more than 6 parts by mass, transparency of the over-sheet decreases, and a resin deteriorates due to too much amount of absorbed energy. Therefore, a sufficiently sharp contrast cannot be obtained. On the other hand, when the amount of the laser energy absorber to be added is less than 0.0001 part by mass, a sufficiently sharp contrast cannot be obtained, which is not preferable.

[1-5] Antioxidant and/or Anticolorant:

It is preferable that an antioxidant and/or an anticolorant are/is contained at the ratio of 0.1 to 5 parts by mass with respect to 100 parts by mass of polycarbonate resin in the core layer. It is preferable to suppress deterioration of a card by blending an antioxidant and/or an anticolorant. As the antioxidant and/or the anticolorant, a phenol antioxidant and/or a phosphite ester anticolorant are/is used in order to further stabilize molar weight or hue in a forming process.

Examples of the phenol antioxidant include α-tocophenol, butylhydroxytoluene, sinapyl alcohol, vitamin E, n-octadecyl-3-(3,5-di-t-butyl-4-hydroxyphenyl)propionate, 3-5-di-t-butyl-4-hydroxytoluene; pentaerythrityl-tetrakis[3-(3,5-di-t-butyl-4-hydroxyphenyl)propionate], triethyleneglycol-bis[3-(3-t-butyl-5-methyl-4-hydroxyphenyl)propionate], 1,6-hexanediol-bis[3-(3,5-di-t-butyl-4-hydroxyphenyl)propionate, 2-tert-butyl-6-(3'-tert-butyl-5'-methyl-2'-hydroxybenzyl)-4-methylphenylacrylate, 2,6-di-tert-butyl-4-(N,N-dimethylaminomethyl)phenol, 3,5-di-tert-butyl-4-hydroxybenzylphosphonatediethylester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidenebis(3-methyl-6-tert-butylphenol), triethyleneglycol-N-bis-3-(3-tert-butyl-4-hydroxy-5-methylphenyl)propionate, 1,6-hexanediolbis[3-(3,5-di-tert-butyl-4-hydroxyphenyl)propionate], bis[2-tert-butyl-4-methyl6-(3-tert-butyl-5-methyl-2-hydroxybenzyl)phenyl]terephthalate, 3,9-bis{2-[3-(3-tert-butyl-4-hydroxy-5-methylphenyl)propionyloxy]-1,1,-dimethylethyl}-2,4,8,10-tetraoxa spiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,2-tiodiethyelenbis-[3-(3,5-di-tert-butyl-4-hydroxyphenyl)propionate], 2,4-bis(n-octylthio)-6-(4-hydroxy-3',5'-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl]hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tris(3,5-di-tert-butyl-4-hydroxyphenyl)isocyanurate, tris(3,5-di-tert-butyl-4-hydroxybenzyl)isocyanurate, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 1,3,5-tris2[3(3,5-di-tert-butyl-4-hydroxyphenyl)propionyloxy]ethylisocyanurate, and tetrakis[3-(3,5-di-tert-butyl-4-hydroxyphenyl)propionyloxymethyl]methane.

Incidentally, among these examples, preferable are n-octadecyl-3-(3,5-di-tert-butyl-hydroxyphenyl)propionate, 1,3,5-trimethyl-2,4,6-tris(3,5-di-tert-butyl-4-hydroxybenzyl)benzene, 1,3,5-tris(3,5-di-tert-butyl-4-hydroxybenzyl)isocyanurate, and tetrakis[3-(3,5-di-tert-butyl-4-hydroxyphenyl)propionyloxymethyl]methane. Particularly preferable is n-octadecyl-3-(3,5-di-tert-butyl-4-hydroxyphenyl)propionate. The aforementioned hindered phenol antioxidants may be used alone or in combination.

Examples of the phosphite ester anticolorant include triphenylphosphite, tris(nonylphenyl)phosphite, tridecylphosphite, trioctylphosphite, trioctadecylphosphite, didecylmonophenylphosphite, dioctylmonophenylphosphite, diisopropylmonophenylphosphite, monobutyldiphenylphosphite, monodecyldiphenylphosphite, monooctyldiphenylphosphite, 2,2-methylenebis(4,6-di-tert-butylphenyl)octylphosphite, tris(diethylphenyl)phosphite, tris(di-iso-propylphenyl)phosphite, tris(di-n-butylphenyl)phosphite, tris(2,4-di-tert-butylphenyl)phosphite, tris(2,6-di-tert-butylphenyl)phosphite, distearyl pentaerythritoldiphosphite, bis(2,4-di-tert-butylphenyl)pentaerythritoldiphosphite, bis(2,6-di-tert-butyl-4-methylphenyl)pentaerythritoldiphosphite, bis(2,6-di-tert-butyl-4-ethylphenyl)pentaerythritoldiphosphite, phenylbisphenolApentaerythritoldiphosphite, bis(nonylphenyl)pentaerythritoldiphosphite, and dicyclohexylpentaerythritoldiphospite.

In addition, as another example, a phosphite compound which reacts with divalent phenols and has acyclic structure can be used. Examples of the phosphite compound include 2,2'-methylenebis(4,6-di-tert-butylphenyl) (2,4-di-tert-butylphenyl)phosphite, 2,2'-methylenebis(4,6-di-tert-butylphenyl) (2-tert-butyl-4-methylphenyl)phosphite, 2,2'-methylenebis(4-methyl-6-tert-butylphenyl) (2-tert-butyl-4-methylphenyl)phosphite, and 2,2'-ethylidenebis(4-methyl-6-tert-butylphenyl) (2-tert-butyl-4-methylphenyl)phosphite.

Of these, particularly preferable is tris(2,4-di-tert-butylphenyl)phosphite. The phosphite ester anticolorant may be used alone or as a mixture of two or more compounds. In addition, the phosphite ester anticolorant may be used together with the phenol antioxidant.

In addition, 0.1 to 5 parts by mass of an ultraviolet absorber and/or a light stabilizer is preferably contained with respect to 100 parts by mass of polycarbonate resin in a core layer. Furthermore, it is preferable to add (blend) an ultraviolet absorber and/or a light stabilizer to suppress light resistance degradability of the card.

Examples of the ultraviolet absorber include 2-(2'-hydroxy-5'-methylphenyl)benzotriazol, 2-(2'-hydroxy-3',5'-di-tert-amylphenyl)benzotriazol, 2-(2'-hydroxy-3',5'-bis(α,α'-dimethylbenzyl)phenylbenzotriazol, 2,2'methylenebis[4-(1,1,3,3-tetramethylbutyl)-6-(2H-benzotriazol-2-yl)phenol], and a benzotriazol-based compound represented by a condensation product with methyl-3-[3-tert-butyl-5-(2H-benzotriazol-2-yl)-4-hydroxyphenylpropionate-polyethyleneglycol.

Furthermore, examples of the ultraviolet absorber include a hydroxyphenyltriazine-based compound such as 2-(4,6-diphenyl-1,3,5-triazine-2-yl)-5-hexyloxyphenol and 2-(4,6-bis(2,4-dimethylphenyl)-1,3,5-triazine-2-yl)-5-hexyloxyphenol.

Moreover, examples of the ultraviolet absorber include a cyclic iminoester-based compound such as 2,2'-p-phenylenebis(3,1-benzooxazine-4-one), 2-2'-m-phenylenebis(3,1-benzooxazine-4-one), and 2,2'-p,p'-diphenylenebis(3,1-benzooxazine-4-one).

In addition, examples of the light stabilizer include hindered amine-based light stabilizers represented by bis(2,2,6,6-tetramethyl-4-piperidyl)sebacate, bis(1,2,2,6,6-pentamethyl-4-piperizil)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, poly{[6-(1,1,3,3-tetramethylbutyl)amino-1,3,5-triazine-2,4-diyl][(2,2,6,6-tetrametylpiperidyl)imino]hexamethylene[(2,2,6,6-tetramethylpiperidyl)imino]}, and polymethylpropyl3-oxy-[4-(2,2,6,6-tetramethyl)piperidinyl]siloxane. Such a light stabilizer exhibits better performance with respect to antiweatherability or the like by being used together with the aforementioned ultraviolet absorber or various kinds of antioxidant in some cases.

[1-6] Mat Processing:

The both surfaces of the over-sheet for a card are subjected to mat processing. A surface on one side (one surface or a front surface) preferably has an average roughness (Ra) of 0.1 to 1.0 µm, and a surface on the other side (opposite surface) preferably has an average roughness (Ra) of 1.1 to 5 µm. Furthermore, it is preferable that the surface having an average roughness (Ra) of 0.1 to 1.0 µm is a surface on one side (outermost surface) and that the surface having an average roughness (Ra) of 1.1 to 5 µm is a surface on the other side (back surface). The reason why the surface roughness in mat processing is different between the front surface and the back surface is because, when the card has a structure of an over-sheet/a core sheet/an over-sheet, upon hot press with lamination so that the back surface is brought into contact with a surface of the core sheet, air between the sheets is easily released, and bubbles do not remain in the card. Thus, it has an effect in suppressing defects of the card.

On the other hand, when the average roughness (Ra) of mat processing of the back surface is less than 1.1 µm, air in the interface of the over-sheet and the core sheet is hardly released upon hot press lamination, and bubbles remain in the card, which easily cause gas burned in a step of irradiating a laser beam for laser color formation. Therefore, defects such as change in color and decrease in laser mark printability are easily caused, which is not preferable. When the average roughness (Ra) of mat processing is more than 5 µm, thermal adhesion of the over-sheet and the core sheet decreases, which is not preferable.

Moreover, when the average roughness (Ra) of the front surface is less than 0.1 µm, there arises a problem of sticking of the sheet on a carrier upon carrying or laminating the sheet, which is not preferable. On the other hand, when it is more than 1.0 µm, sharpness of images, letters, and the like, printed on, for example, the core sheet in the card decreases, which is not preferable.

[1-7] Other Additives:

In the present invention, additives such as a colorant, a filler, and flame retardant may be added (blended) as necessary to each layer of the sheet, or different kinds of polymers may be blended in order to improve physical property.

[1-8] Method for Forming Over-Sheet for Card

In the present invention, in order to obtain a three-layer over-sheet for a card, there may be employed a coextrusion method, where a resin composition for each layer is subjected to coextrusion for lamination, a method where each layer is formed into a film-like shape, followed by lamination, a method where two layers are formed by coextrusion, followed by laminating a film which is independently formed on the two layers, or the like. However, lamination by a coextrusion method is preferable from the viewpoint of productivity and costs.

Specifically, a resin composition for each layer is blended, formed into a pellet-like shape as necessary, put in each hopper of a three-layer T-die extruder having a T-die shared by the hoppers, melted at 200 to 280° C., subjected to three-layer T-die coextrusion, solidified by cooling with a cooling roll or the like to form a three-layer laminated body. Incidentally, a sheet for a card of the present invention can be formed by a known method without limiting to the above method and can be obtained, for example, according to the description in JP-A-10-71763, Pages 6 to 7.

EXAMPLE

Hereinbelow, the present invention will be described more specifically by Examples. However, the present invention is by no means limited to the Examples. Incidentally, in the following Examples and Comparative Examples, "part(s)" and "%" means part(s) by mass and % by mass, respectively, unless otherwise noted. In addition, various kinds of evaluations and measurements in Examples were conducted by the following methods.

[1] Sheet-Carrying Ability:

After the over-sheets and core sheets of Manufacturing Examples 1 to 7 were cut to have a shape of 200×200 mm, they were carried by a carrier machine. When lamination was performed in the order of an over-sheet/a core sheet/a core sheet/an over-sheet, the sheet-carrying ability was evaluated by the following criteria for judgment.

○: No problem

Δ: Upon laminating sheets, sheets are hard to detach from the adsorbing portion and are out of alignment x: Upon laminating sheets, sheets are difficult to detach from the adsorbing portion

[2] Mold Releasability after Hot Press Formation of Card Lamination:

The aforementioned laminated sheet was sandwiched by two chromium-plated steel plates and kept for 10 minutes at a press temperature of 120° C. under a pressure of 50 kgf/cm². Then, after cooling down to room temperature, the sample sandwiched by the chromium-plated steel plates was taken out together with the chromium-plated steel plates. Mold-releasability from the die when the chromium-plated steel plates were peeled off from the sample was evaluated.

○: Easily peeled

Δ: Slightly adhered to the die and could be peeled, but could not be used because a surface of the sheet was damaged x: Adhered to the die

[3] Bubble Releasability and Thermal Adhesion:

a) Bubble releasability . . . A state of remaining bubbles in the laminated body after hot press was observed as described above to evaluate bubble releasability.

○: No bubble in the laminated body x: Bubbles were remaining in the laminated body b) Thermal adhesion . . . Adhesion force was observed by slightly inserting a cutter blade between the sheets constituting the laminated body.

○: No peeling, x: Peeling caused in a part or over the whole surface

[4] Laser Marking Ability:

Laser marking ability was evaluated by the use of Nd·YVO4 lasers (Trade name: LT-100SA, produced by Laser Technology, Inc., and Trade name: RSM103D produced by Rofin-Sinar, Technologies, Inc.). Specifically, laser marking ability was judged from quality of contrast, presence/absence of abnormality such as breakage in the surface layer or the like by performing marking at a laser-irradiating rate of 400 mm/sec.

○: Contrast ratio of 3 or more, no breakage in the surface layer, and no resin burning Δ: Contrast ratio of 2 or more and less than 3, no breakage in the surface layer, and no resin burning x: Contrast ratio of less than 2 and/or breakage in the surface layer or resin burning

[5] Transparency of Over-Sheet:

Total light transmittance of the over-sheet was measured by the use of a spectrophotometer (Trade name: EYE7000 produced by Macbeth, Co.).

○: Total light transmittance of 80% or more

Δ: Total light transmittance of 60% or more and less than 80% x: Total light transmittance of less than 60%

Manufacture Example 1

Over-Sheet A

There were used amorphous polyester (Trade name: "Easter GS071" produced by Eastman Chemical Company, EG/CHDM=70/30 mole %) for a skin layer and polycarbonate (Trade name: "Taflone FN2500A" produced by Idemitsu Kosan, Co., Ltd., melt volume rate=8 cm$^3$/10 min.). There was further added 0.3 part by mass of calcium stearate as lubricant to the amorphous polyester. Further, to the above polycarbonate were added 0.001 part by mass of carbon black (#10 produced by Mitsubishi Chemical Corporation, average particle size of 75 nm, DBP oil absorption of 86 ml/100 g) as an energy absorber for absorbing a laser beam, 0.1 part of n-octadecyl-3-(3,5-di-t-butyl-4-hydroxyphenyl)propionate (Trade name: IRGANOX 1076 produced by Ciba Specialty Chemicals Inc.) as a phenol antioxidant, 0.2 part of 2-(2'-hydroxy-3',5'-di-t-butylphenyl)-5-chlorobenzotriazol (Trade name: "TINUVIN 327" produced by Ciba Specialty Chemicals Inc.) as an ultraviolet absorber to obtain a core sheet for a three-layer card of a skin layer/a core layer/a skin layer by T-die coextrusion. The total thickness of the sheet was 100 μm, the skin layers of the front and back surfaces had the same thickness to have the structure of a skin layer (27 μm)/a core layer (46 μm)/a skin layer (27 μm) with the thickness percentage of the core layer being 46%. Further, mat processing was performed in such a manner that a surface on one side has an average surface roughness (Ra) of 0.4 to 0.7 μm and that a surface on the other side (back surface) has an average surface roughness (Ra) of 1.2 to 1.8 μm to obtain a three-layer over-sheet A.

Manufacture Example 2

Over-Sheet B

In the same manner as in Manufacture Example 1, the total thickness of the sheet was made 60 μm, and the front and back skin layers had the same thickness to have the structure of a skin layer (20 μm)/a core layer (20 μm)/a skin layer (20 μm) with the thickness percentage of the core layer being 33%. Further, mat processing was performed in such a manner that a surface on one side has an average surface roughness (Ra) of 0.4 to 0.7 μm and that a surface on the other side (back surface) has an average surface roughness (Ra) of 1.2 to 1.8 μm to obtain a three-layer over-sheet B.

Manufacture Example 3

Core Sheet C

There were used amorphous polyester (Trade name: "Easter GS071" produced by Eastman Chemical Company, EG/CHDM=70/30 mole %) for a skin layer and polycarbonate (Trade name: "Taflone FN2500A" produced by Idemitsu Kosan, Co., Ltd., melt volume rate=8 cm$^3$/10 min.). There was further added 0.3 part by mass of calcium stearate as a lubricant to the amorphous polyester. Further, to the above polycarbonate were added 0.001 part by mass of carbon black as an energy absorber for absorbing a laser beam, 0.1 part of n-octadecyl-3-(3,5-di-t-butyl-4-hydroxyphenyl)propionate (Trade name: "IRGANOX 1076" produced by Ciba Specialty Chemicals Inc.) as a phenol antioxidant, 0.2 part of 2-(2'-hydroxy-3',5'-di-t-butylphenyl)-5-chlorobenzotriazol (Trade name: "TINUVIN 327" produced by Ciba Specialty Chemicals Inc.) and 5 parts of titanium oxide as an ultraviolet absorber to obtain a three-layer core sheet of a skin layer/a core layer/a skin layer for a card by T-die coextrusion. The total thickness of the sheet was made 280 μm, the skin layers of the front and back surfaces had the same thickness to have the structure of a skin layer (40 μm)/a core layer (200 μm)/a skin layer (40 μm) with the thickness percentage of the core layer being 71%. Furthermore, mat processing was performed in such a manner that a surface on one side has an average surface roughness (Ra) of 0.9 to 1.6 μm and that a surface on the other side (back surface) has an average surface roughness (Ra) of 0.7 to 1.2 μm to obtain a three-layer over-sheet C.

Manufacture Example 4

Over-Sheet D

The over-sheet D was obtained in the same manner as in Manufacture Example 1 except that a lubricant was not added to amorphous polyester.

Manufacture Example 5

Over-Sheet E

The over-sheet E was obtained in the same manner as in Manufacture Example 1 except that mat processing was not performed to the skin layers of the three-layer sheet.

Manufacture Example 6

Over-Sheet F

The over-sheet F was obtained in the same manner as in Manufacture Example 1 except that 1 part by mass of tin oxide was blended in place of 0.001 part by mass of carbon black as a laser beam energy absorber of the three-layer sheet.

Manufacture Example 7

Over-Sheet G

The over-sheet G was obtained in the same manner as in Manufacture Example 1 except that 5 parts by mass was blended as a laser beam energy absorber of the three-layer sheet.

Manufacture Example 8

Over-Sheet H

The over-sheet H was obtained in the same manner as in Manufacture Example 1 except that the thickness percentage of the core layer on the three-layer sheet was 80%.

The aforementioned manufacture examples 1 to 8 formed above were subjected to various kinds of evaluations as Examples 1 and 2 and Comparative Examples 1 to 5 by the constitutions shown in Tables 1 and 2. The results are shown in Tables 1 and 2.

(Discussion)

As shown in Table 1, both the Examples 1 and 2 were excellent as an over-sheet for a card because they were excellent in sheet-carrying ability, mold-releasability of a card, bubble releasability, and thermal adhesion and excellent in laser marking ability and transparency. On the other hand, Comparative Example 1 has difficulty in practical use because of bad mold-releasability in a hot press step since a lubricant was not added to the skin layers of the over-sheet D. In addition, in Comparative Example 2, since mat processing was not performed to the surfaces of the over-sheets, sheet cannot be detached easily from a carrier upon carrying the sheet, bubble releasability in a sheet lamination step and a hot press step was bad, bubbles remained in the laminate to cause gas burned during laser marking, and therefore it had inferior laser marking ability.

As shown in Table 2, in Comparative Example 3, since tin oxide was used in place of carbon black as a laser beam energy absorber, it had inferior laser marking ability. In Comparative Example 4, since the amount of carbon black as a laser beam energy absorber was increased to 5 parts by mass, the over-sheet had inferior transparency and inferior laser marking ability. In Comparative Example 5, since thickness percentage of the core layer of the over-sheet was 80%, a skin layer on one side had a thickness of merely 10 μm, and it had difficulty in practical use because of bad mold-releasability in a hot press step though a predetermined lubricant was blended in the skin layers.

TABLE 1

|  | Example 1 | Example 2 | Comparative Example 1 | Comparative Example 2 |
|---|---|---|---|---|
| Over sheet | Manufacture Example 1 Over sheet A | Manufacture Example 2 Over sheet B | Manufacture Example 4 Over sheet D | Manufacture Example 5 Over sheet E |
| Core sheet | Manufacture Example 3 Core sheet C | Manufacture Example 3 Core sheet C | Manufacture Example 3 Core sheet C | Manufacture Example 3 Core sheet C |
| Constitution of the laminated body | A/C/C/A | B/C/C/B | D/C/C/D | E/C/C/E |
| Sheet-carrying ability | ○ | ○ | ○ | x |
| Mold Releasability | ○ | ○ | x | ○ |
| Bubble releasability | ○ | ○ | ○ | ○ |
| Thermal adhesion | ○ | ○ | ○ | ○ |
| Laser marking ability | ○ | ○ | ○ | x |
| Transparency | ○ | ○ | ○ | ○ |

TABLE 2

|  | Comparative Example 3 | Comparative Example 4 | Comparative Example 5 |
|---|---|---|---|
| Over sheet | Manufacture Example 6 Over sheet F | Manufacture Example 7 Over sheet G | Manufacture Example 8 Over sheet H |
| Core sheet | Manufacture Example 3 Core sheet C | Manufacture Example 3 Core sheet C | Manufacture Example 3 Core sheet C |
| Constitution of the laminated body | F/C/C/F | G/C/C/G | H/C/C/H |
| Sheet-carrying ability | ○ | ○ | ○ |
| Mold Releasability | ○ | ○ | x |
| Bubble releasability | ○ | ○ | ○ |
| Thermal adhesion | ○ | ○ | ○ |
| Laser marking ability | x | Δ | ○ |
| Transparency | ○ | Δ | ○ |

INDUSTRIAL APPLICABILITY

An over-sheet for a card of the present invention is a non-PVC type sheet for a card and has excellent laser marking ability and excellent transparency. Therefore, even in a card where an image or a letter is printed on a core sheet, the image or the letter is clear. The sheet is a multilayer sheet excellent in sheet-carrying ability, lamination ability, thermal resistance without deformation "warpage" of the sheet due to heating in the hot press step. Therefore, the sheet can suitably be used as an over-sheet for a non-contact type or contact type card.

The invention claimed is:

1. An over-sheet for a card, comprising at least three layers including two skin layers and a core layer, each of the two skin layers being an outermost layer of the over-sheet, the at least three layers being laminated by a coextrusion technique, wherein each of the two skin layers is formed of an amorphous aromatic polyester-based resin composition comprising:
a copolymerized polyester resin formed of:
   a dicarboxylic acid unit containing, as a main component, terephthalic acid unit; and
   a glycol unit containing, as a main component, an ethylene glycol unit (I) and 1,4-cyclohexanedimethanol unit (II), an amount of the ethylene glycol unit (I) and an amount of the 1,4-cyclohexanedimethanol unit (II) having a relation of (I)/(II)=90 to 30/10 to 70 mol %; and
at least one lubricant selected from the group of fatty acid ester, fatty acid amide, and fatty acid metal salt, an amount of the lubricant being 0.01 to 3 parts by mass with respect to 100 parts by mass of the copolymerized polyester resin,
wherein the core layer is transparent, and formed of a polycarbonate resin which is transparent,
wherein the core layer contains 0.0001 to 1 parts by mass of carbon black, which is an energy absorber, or 0.0001 to 3 parts by mass of a mixture of carbon black and at least one selected from the group consisting of metal oxide, metal sulfate, metal carbonate and metal silicate having an average particle size of less than 50 nm with respect to 100 parts by mass of the polycarbonate resin, and
wherein a total thickness of the over-sheet is 50 to 150 μm, a percentage of a thickness of the core layer in the total thickness of the over-sheet is 25% or more and less than 50%, and a total light transmittance of the over-sheet is 80% or more.

2. The over-sheet for a card according to claim 1, wherein mat processing of an average roughness (Ra) of 0.1 to 1.0 μm is applied on a surface on one side of the over-sheet for a card, and mat processing of an average roughness (Ra) of 1.1 to 5 μm is applied on a surface on the other side of the over-sheet for a card.

3. The over-sheet for a card according to claim 1, wherein the carbon black has an average particle size of 10 to 90 nm, and an amount of dibutyl phthalate oil absorption of 60 to 170 ml/100 g.

4. The over-sheet for a card according to claim 1, wherein the core layer contains 0.1 to 5 parts by mass of an antioxidant and/or an anticolorant with respect to 100 parts by mass of the polycarbonate resin, and contains 0.1 to 5 parts by mass of an ultraviolet absorber and/or a light stabilizer with respect to 100 parts by mass of the polycarbonate resin.

5. The over-sheet for a card according to claim 1, wherein each of the two skin layers contains 0.01 to 5 parts by mass of an antimicrobial with respect to 100 parts by mass of the copolymerized polyester resin.

6. The over-sheet for a card according to claim 2, wherein the carbon black has an average particle size of 10 to 90 nm, and an amount of dibutyl phthalate oil absorption of 60 to 170 ml/100 g.

7. The over-sheet for a card according to claim 2, wherein the core layer contains 0.1 to 5 parts by mass of an antioxidant and/or an anticolorant with respect to 100 parts by mass of the polycarbonate resin, and contains 0.1 to 5 parts by mass of an ultraviolet absorber and/or a light stabilizer with respect to 100 parts by mass of the polycarbonate resin.

8. The over-sheet for a card according to claim 3, wherein the core layer contains 0.1 to 5 parts by mass of an antioxidant and/or an anticolorant with respect to 100 parts by mass of the polycarbonate resin, and contains 0.1 to 5 parts by mass of an ultraviolet absorber and/or a light stabilizer with respect to 100 parts by mass of the polycarbonate resin.

9. The over-sheet for a card according to claim 6, wherein the core layer contains 0.1 to 5 parts by mass of an antioxidant and/or an anticolorant with respect to 100 parts by mass of the polycarbonate resin, and contains 0.1 to 5 parts by mass of an ultraviolet absorber and/or a light stabilizer with respect to 100 parts by mass of the polycarbonate resin.

10. The over-sheet for a card according to claim 2, wherein each of the two skin layers contains 0.01 to 5 parts by mass of an antimicrobial with respect to 100 parts by mass of the copolymerized polyester resin.

11. The over-sheet for a card according to claim 3, wherein each of the two skin layers contains 0.01 to 5 parts by mass of an antimicrobial with respect to 100 parts by mass of the copolymerized polyester resin.

* * * * *